(12) United States Patent
Voytovych et al.

(10) Patent No.: US 10,151,322 B2
(45) Date of Patent: Dec. 11, 2018

(54) TANDEM TIP BLADE

(71) Applicant: United Technologies Corporation, Farmington, CT (US)

(72) Inventors: Dmytro Mykolayovych Voytovych, Rocky Hill, CT (US); Alexander Staroselsky, Avon, CT (US); Eric D. Gray, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 228 days.

(21) Appl. No.: 15/160,165

(22) Filed: May 20, 2016

(65) Prior Publication Data

US 2017/0335860 A1 Nov. 23, 2017

(51) Int. Cl.
| | |
|---|---|
| *F02C 3/04* | (2006.01) |
| *F04D 29/32* | (2006.01) |
| *F02K 3/06* | (2006.01) |
| *F04D 29/38* | (2006.01) |
| *F01D 5/14* | (2006.01) |
| *F01D 5/22* | (2006.01) |

(52) U.S. Cl.
CPC .......... *F04D 29/324* (2013.01); *F01D 5/146* (2013.01); *F02C 3/04* (2013.01); *F02K 3/06* (2013.01); *F04D 29/384* (2013.01); *F01D 5/225* (2013.01); *F05D 2220/323* (2013.01); *F05D 2240/307* (2013.01); *F05D 2240/35* (2013.01)

(58) Field of Classification Search
CPC . F02C 3/04; F02K 3/06; F04D 29/324; F04D 29/384; F05D 2220/323; F05D 2240/307; F05D 2240/35
See application file for complete search history.

(56) References Cited

U.S. PATENT DOCUMENTS 3,756,739 A * 9/1973 Boussuges .............. F03B 3/103
415/161
4,102,600 A * 7/1978 Schwab ................... F01D 5/145
416/231 R
(Continued)

FOREIGN PATENT DOCUMENTS

| CN | 103953579 A | 7/2014 |
|---|---|---|
| JP | H07279887 A | 10/1995 |

(Continued)

OTHER PUBLICATIONS

European Search Report for EP Application No. 17172283.8; dated Nov. 9, 2017; 9 pages.

*Primary Examiner* — Jesse Bogue
(74) *Attorney, Agent, or Firm* — Cantor Colburn LLP

(57) ABSTRACT

A tandem tip blade includes a main blade body, a front blade and a rear blade. The front blade extends from a main body end. Each of a front blade pressure side and a front blade suction side extends between a front blade leading edge and a front blade trailing edge and a front blade tip extending from the front blade pressure side to the front blade suction side. The rear blade extends from the main body end. Each of a rear blade pressure side and a rear blade suction side extends between a rear blade leading edge and a rear blade trailing edge, and a rear blade tip extending from the rear blade pressure side to the rear blade suction side.

17 Claims, 3 Drawing Sheets

(56) References Cited

U.S. PATENT DOCUMENTS

| | | | | |
|---|---|---|---|---|
| 4,687,416 A * | 8/1987 | Spranger | ................ | B64C 11/18 416/200 R |
| 5,236,307 A * | 8/1993 | Ng | ................ | F01D 5/146 415/148 |
| 6,099,249 A * | 8/2000 | Hashimoto | ................ | F01D 5/142 415/181 |
| 6,350,103 B1 * | 2/2002 | Hashimoto | ................ | F01D 5/146 415/199.5 |
| 6,715,983 B2 * | 4/2004 | Koshoffer | ................ | F01D 5/146 415/1 |
| 7,396,208 B1 * | 7/2008 | Hussain | ................ | F01D 5/146 416/227 A |
| 9,617,868 B2 * | 4/2017 | Bloxham | ................ | F01D 5/146 |
| 9,739,154 B2 * | 8/2017 | Derclaye | ................ | F01D 5/142 |
| 2008/0298974 A1 * | 12/2008 | Guemmer | ................ | F04D 29/324 416/223 R |
| 2012/0148396 A1 * | 6/2012 | Guemmer | ................ | F01D 5/145 415/208.2 |
| 2014/0328675 A1 * | 11/2014 | Derclaye | ................ | F01D 5/142 415/194 |
| 2016/0130973 A1 * | 5/2016 | Pachidis | ................ | F01D 5/146 415/148 |
| 2016/0177728 A1 | 6/2016 | Tanimitsu | | |
| 2016/0245091 A1 * | 8/2016 | Kupratis | ................ | F01D 5/146 |

FOREIGN PATENT DOCUMENTS

| | | |
|---|---|---|
| SU | 1758247 A1 | 8/1992 |
| WO | 2005040559 A1 | 5/2005 |
| WO | 2015072256 A1 | 5/2015 |

* cited by examiner

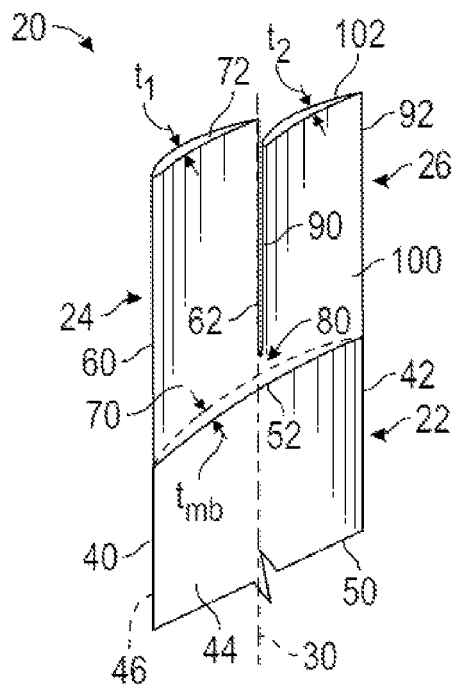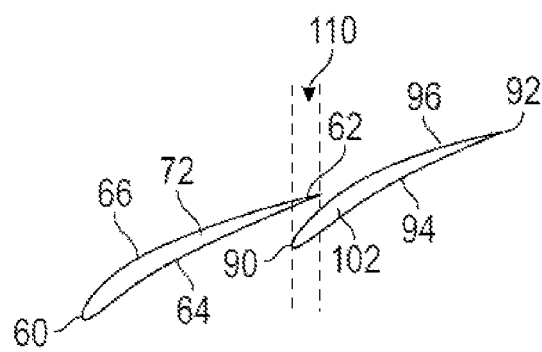
FIG. 2
FIG. 3
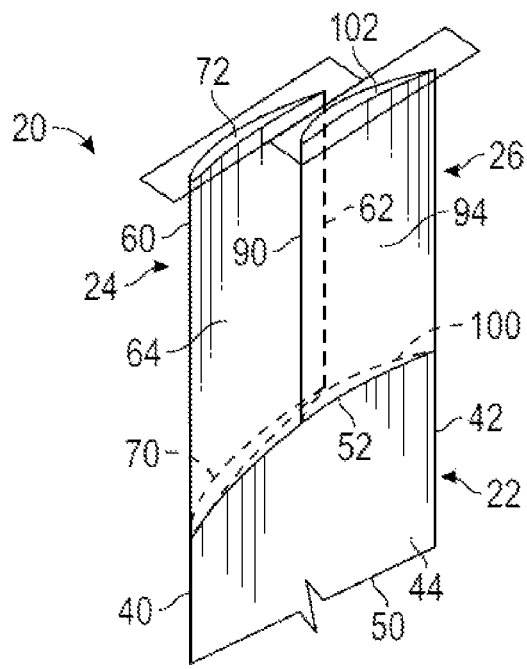
FIG. 4

TANDEM TIP BLADE

BACKGROUND

Gas turbine engines are provided with rotor blades. The blades may be part of a rotor or a stator. The rotor blades may be provided in adjacent and distinct pairs that are radially offset from each other such that a front blade is radially forward of a rear blade. During operation of the gas turbine engine, compression of the flow is accomplished by turning the flow by the rotor blades. For a fixed rotational rotor speed the rotor blade loading is changing with mass flow rate such that it is higher at lower mass flow rate and lower at higher mass flow rate. Due to adverse pressure gradient the rotor blades may experience separation on suction side leading to stall limiting lower mass flow rate boundary of the rotor blade operational range. At last stages of high pressure compressor there is a leakage flow through clearances between rotating and stationary parts leading to degradation of performance. Reduced performance and operational ranges may result from the tip clearances being larger as compared to the rotor blade span than in the front stages due to smaller span size of rear stage rotor blades.

Accordingly, it is desirable to provide a blade having an improved solidity at the tip and improved gas turbine engine performance and operational ranges.

BRIEF DESCRIPTION

According to an embodiment of the present disclosure, a tandem tip blade is provided. The tandem tip blade includes a main body, a front blade, and a rear blade. The main body extends from a base along a span wise axis. The main body has a main body leading edge disposed opposite a main body trailing edge. The front blade extends from an end of the main body. The front blade has a front blade leading edge disposed opposite a front blade trailing edge. The rear blade extends from the end of the main body. The rear blade is spaced apart from the front blade. The rear blade has a rear blade leading edge disposed opposite a rear blade trailing edge. The rear blade leading edge is disposed adjacent to and is offset from the front blade trailing edge.

In addition to one or more of the features described above, or as an alternative to any of the foregoing embodiments, the front blade leading edge is a smooth extension of the main body leading edge.

In addition to one or more of the features described above, or as an alternative to any of the foregoing embodiments, the rear blade trailing edge is a smooth extension of the main body trailing edge.

In addition to one or more of the features described above, or as an alternative to any of the foregoing embodiments, the front blade and the rear blade extend from a transition region disposed proximate a mid-span region of the tandem tip blade.

In addition to one or more of the features described above, or as an alternative to any of the foregoing embodiments, a shroud engages respective tips of the front blade and the rear blade.

In addition to one or more of the features described above, or as an alternative to any of the foregoing embodiments, the rear blade is circumferentially spaced apart from the front blade.

In addition to one or more of the features described above, or as an alternative to any of the foregoing embodiments, the front blade trailing edge and the rear blade leading edge axially overlap each other within an overlap region.

According to another embodiment of the present disclosure, a tandem blade is provided. The tandem blade includes a front blade and a rear blade. The front blade extends from a main body end. The front blade has a front blade pressure side disposed opposite a front blade suction side. Each of the front blade pressure and the front blade suction side extends between a front blade leading edge and a front blade trailing edge and a front blade tip extending from the front blade pressure side to the front blade suction side. The rear blade extends from the main body end. The rear blade has a rear blade pressure side disposed opposite a rear blade suction side. Each of the rear blade pressure side and the rear blade suction side extends between a rear blade leading edge and a rear blade trailing edge, and a rear blade tip extending from the rear blade pressure side to the rear blade suction side.

In addition to one or more of the features described above, or as an alternative to any of the foregoing embodiments, the front blade trailing edge is disposed proximate the rear blade suction side and the rear blade leading edge is disposed proximate the front blade pressure side.

In addition to one or more of the features described above, or as an alternative to any of the foregoing embodiments, the rear blade leading edge abuts the front blade trailing edge.

In addition to one or more of the features described above, or as an alternative to any of the foregoing embodiments, the front blade and the rear blade extend from a mid-span region disposed at the main body end.

In addition to one or more of the features described above, or as an alternative to any of the foregoing embodiments, the front blade and the rear blade extend from a transition region disposed between a mid-span region, a front blade base, and a rear blade base.

In addition to one or more of the features described above, or as an alternative to any of the foregoing embodiments, the main body has a main body pressure side disposed opposite a main body suction side extending between a main body leading edge and a main body trailing edge.

In addition to one or more of the features described above, or as an alternative to any of the foregoing embodiments, the main body has a main body thickness extending between the main body pressure side and the main body suction side.

In addition to one or more of the features described above, or as an alternative to any of the foregoing embodiments, the front blade has a front blade thickness extending between the front blade pressure side and the front blade pressure side and the rear blade has a rear blade thickness extending between the rear blade pressure side and the rear blade suction side.

In addition to one or more of the features described above, or as an alternative to any of the foregoing embodiments, the main body thickness is greater than the front blade thickness and the rear blade thickness.

In addition to one or more of the features described above, or as an alternative to any of the foregoing embodiments, a shroud engages the tips of the front blade and the rear blade.

According to yet another embodiment of the present disclosure, a gas turbine engine is provided. The gas turbine engine includes a fan section, a compressor section disposed adjacent to the fan section, a combustor section disposed adjacent to the compressor section, a turbine section disposed adjacent to the combustor section, and a tandem tip blade incorporated into a rotor provided with the compressor section. The tandem tip blade includes a main body, a front blade, and a rear blade. The main body has a main body leading edge disposed opposite a main body trailing edge. The front blade extends radially from a main body end towards a front blade tip and axially from the main body leading edge towards a mid-chord of the main body. The rear blade is spaced apart from the front blade towards a rear blade tip and extends radially from the main body end and extends axially from the main body trailing edge towards the mid-chord of the main body. The rear blade is circumferentially offset from the front blade in a direction that extends from a front blade suction side towards a front blade pressure side or in a direction that extends from the front blade pressure side towards the front blade suction side In addition to one or more of the features described above, or as an alternative to any of the foregoing embodiments, the front blade is shaped such that the front blade has a front blade thickness and no camber angle for transonic inlet flow and the rear blade is shaped such that the rear blade has a rear blade thickness with a camber angle for at least one of subsonic and low transonic passage flow.

In addition to one or more of the features described above, or as an alternative to any of the foregoing embodiments, the front blade is shaped such that the front blade has a front blade thickness and camber angle for subsonic inlet flow and the rear blade is shaped such that the rear blade has a rear blade thickness with a camber angle.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 2 is a perspective view of an embodiment of a blade having a tandem tip and tandem blades blended into an end of the main blade body;

FIG. 3 is a top view of a front blade and a rear blade of the tandem blade of FIG. 2;

FIG. 4 is a perspective view of the tandem blade stacked on top of the base of the tandem blade of FIG. 2;

DETAILED DESCRIPTION

Referring now to the Figures, where the present disclosure will be described with reference to specific embodiments, without limiting same, it is to be understood that the disclosed embodiments are merely illustrative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
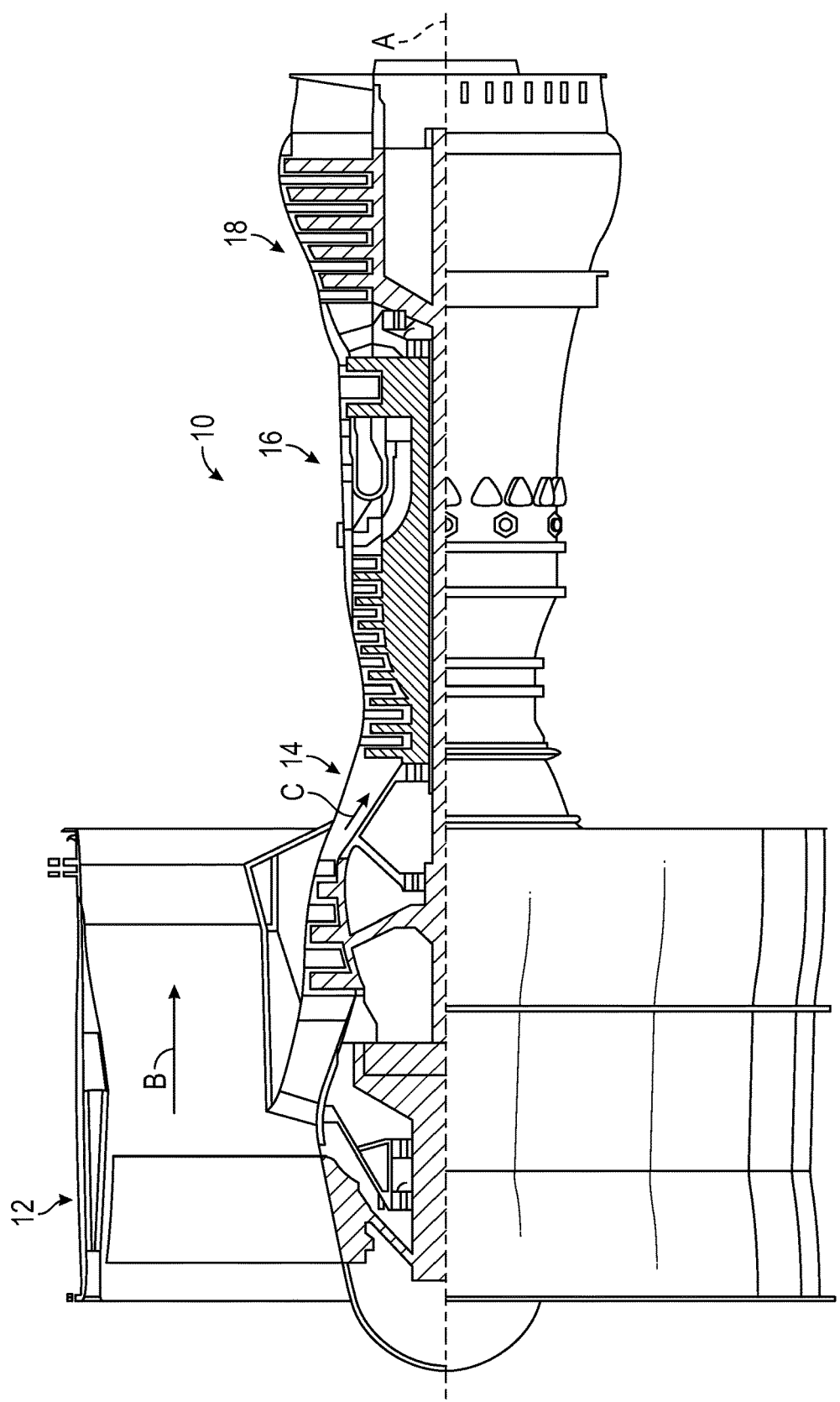
FIG. 1 is a schematic illustration of a gas turbine engine.

Referring to FIG. 1 a gas turbine engine 10 is schematically illustrated. The gas turbine engine 10 may be a two-spool turbofan engine that includes a fan section 12, a compressor section 14 disposed adjacent to the fan section 12, a combustor section 16 disposed adjacent to the compressor section 14, and a turbine section 18 disposed adjacent to the combustor section. Alternative gas turbine engines may include an augmenter section (not shown) among other systems or features. The fan section 12, the compressor section 14, and the turbine section 18 may be rotatable about an axis A.

The fan section 12 drives air along a bypass flow path B, while the compressor section 14 drives air along a core flow path C for compression and communication into the combustor section 16. Hot combustion gases generated within the combustor section 16 are expanded through the turbine section 18. Although depicted as a two-spool turbofan gas turbine engine, it should be understood that the concepts described herein are not limited to two-spool turbofan engines and these teachings could extend to other types of engines, including but not limited to, three-spool engine architectures.

Referring to FIGS. 2-6, a tandem tip blade 20 may be provided with the gas turbine engine 10. The tandem tip blade 20 may be provided with a blade that is incorporated into at least one of the fan section 12, the compressor section 14, and the turbine section 18. The tandem tip blade 20 may be incorporated into a rotating component such as a rotor that is provided with at least one of the fan section 12, the compressor section 14, and the turbine section 18. The tandem tip blade 20 may be circumferentially disposed about the axis A. The tandem tip blade 20 improves the operational range and performance of the gas turbine engine 10. The tandem tip blade 20 may enable the removal of stators and combine two rotors into the tandem tip blade 20 and maintain loading of two stages and reduce leakage flow and improve performance of the gas turbine engine 10. The tandem tip blade 20 includes a main body 22, a front blade 24 extending from the main body 22, and a rear blade 26 extending from the main body 22.

The main body 22 extends from a base or platform along a span wise axis 30. In at least one embodiment, the base or platform is connected to a dovetail or other connecting feature that connects the tandem tip blade 20 to a rotating component. The span wise axis 30 may define a stacking line of the tandem tip blade 20. The main body 22 includes a main body leading edge 40, a main body trailing edge 42, a main body pressure side 44, and a main body suction side 46. The main body leading edge 40 is disposed opposite the main body trailing edge 42.

The main body leading edge 40 and the main body trailing edge 42 extend from a main body base 50 towards a main body end 52. The main body base 50 defines a root of the tandem tip blade 20. The main body end 52 is disposed opposite the main body base 50. The main body end 52 defines a mid-span region that may extend above and/or below the mid-span or mid-chord region of the tandem tip blade 20.

The main body pressure side 44 extends axially between the main body leading edge 40 and the main body trailing edge 42. The main body pressure side 44 extends between the main body base 50 and the main body end 52. The main body suction side 46 is disposed opposite the main body pressure side 44. The main body suction side 46 extends axially between the main body leading edge 40 and the main body trailing edge 42. The main body suction side 46 extends between the main body base 50 and the main body end 52.

The main body 22 has a maximum main body thickness, $t_{mb}$. The maximum main body thickness, $t_{mb}$, extends between the main body pressure side 44 and the main body suction side 46.

The front blade 24 extends radially from the main body 22. The front blade 24 also extends axially from the main body leading edge 40 towards the mid-chord of the main body 22 or the span wise axis 30. The front blade 24 includes a front blade leading edge 60, a front blade trailing edge 62, a front blade pressure side 64 (FIG. 3), and a front blade suction side 66 (FIG. 3).

The front blade leading edge 60 is disposed opposite the front blade trailing edge 62. The front blade leading edge 60 is disposed opposite the front blade trailing edge 62. The front blade leading edge 60 is configured as a smooth continuation or smooth extension of the main body leading edge 40. The front blade trailing edge 62 is disposed along the span wise axis 30.

The front blade leading edge 60 and the front blade trailing edge 62 extend from a front blade base 70 towards a front blade tip 72. The front blade base 70 may be spaced apart from the main body end 52 by a transition region 80. The front blade base 70 may abut or be joined to the main body end 52 such that the front blade 24 directly extends from the main body end 52, as shown in FIG. 2.

The front blade pressure side 64 extends axially between the front blade leading edge 60 and the front blade trailing edge 62. The front blade pressure side 64 extends between the front blade base 70 and the front blade tip 72. The front blade suction side 66 is disposed opposite the front blade pressure side 64. The front blade suction side 66 extends axially between the front blade leading edge 60 and the front blade trailing edge 62. The front blade suction side 66 extends between the front blade base 70 and the front blade tip 72.

The front blade tip 72 extends between the front blade leading edge 60, the front blade trailing edge 62, the front blade pressure side 64, and the front blade suction side 66.

The front blade 24 has a maximum front blade thickness, $t_1$. The maximum front blade thickness, $t_1$, extends between the front blade pressure side 64 and the front blade suction side 66.

The rear blade 26 extends radially from the main body 22. The rear blade 26 is spaced apart from the front blade 24, while still extending from the main body 22. The rear blade 26 extends axially from the main body trailing edge 42 towards the mid-chord of the main body 22 or the span wise axis 30. The rear blade 26 includes a rear blade leading edge 90, a rear blade trailing edge 92, a rear blade pressure side 94 (FIG. 3), and a rear blade suction side 96 (FIG. 3).

The rear blade leading edge 90 is disposed opposite the rear blade trailing edge 92. The rear blade leading edge 90 is disposed along the span wise axis 30.

As shown in FIG. 3, the rear blade leading edge 90 is disposed proximate the front blade trailing edge 62. The rear blade leading edge 90 is disposed adjacent to and is circumferentially offset from the front blade trailing edge 62 such that the rear blade leading edge 90 at least partially axially overlaps the front blade trailing edge 62 within an overlap region 110. The front blade trailing edge 62 is located downstream relative to the rear blade leading edge 90. The rear blade leading edge 90 is disposed proximate the front blade pressure side 64. In at least one embodiment, the rear blade leading edge 90 is disposed proximate the front blade suction side 66.

Figure 5:
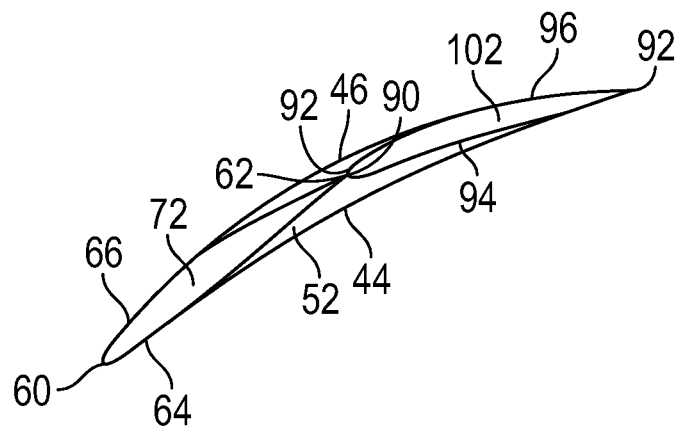
FIG. 5 is a view of a front blade and a rear blade of another tandem blade embodiment.

As shown in FIG. 5, in another embodiment, the rear blade leading edge 90 may abut the front blade trailing edge 62. In such an embodiment, the rear blade leading edge 90 extends directly from the front blade trailing edge 62.

The rear blade trailing edge 92 is a smooth extension of the main body trailing edge 42. The rear blade leading edge 90 and the rear blade trailing edge 92 extend from the rear blade base 100 (FIG. 6) towards the rear blade tip 102. The rear blade base 100 may be spaced apart from the main body end 52 by the transition region 80. The transition region 80 extends between a location along the span, the main body end 52, the front blade base 70, and the rear blade base 100. The transition region 80 provides a smooth transition between the main body 22 and the front blade 24 and the rear blade 26. The rear blade base 100 may abut or be joined to the main body end 52 such that the rear blade 26 directly extends from the main body end 52, as shown in FIG. 3.

The rear blade pressure side 94 extends axially between the rear blade leading edge 90 and the rear blade trailing edge 92. The rear blade pressure side 94 extends between the rear blade base 100 and the rear blade tip 102. The rear blade suction side 96 is disposed opposite the rear blade pressure side 94. The rear blade suction side 96 extends axially between the rear blade leading edge 90 and the rear blade trailing edge 92. The rear blade suction side 96 extends between the rear blade base 100 and the rear blade tip 102.

The rear blade tip 102 extends between the rear blade leading edge 90, the rear blade trailing edge 92, the rear blade pressure side 94, and the rear blade suction side 96. In at least one embodiment, the front blade 24 has a substantially similar height as the rear blade 26. In at least one embodiment, the front blade 24 and the rear blade 26 have varying heights that extend from the tandem blade base towards the tandem blade tip. For example, the front blade tip 72 may be disposed above the rear blade tip 102 or the front blade tip 72 may be disposed below the rear blade tip 102.

The rear blade 26 has a maximum rear blade thickness, $t_2$. The maximum rear blade thickness, $t_2$, extends between the rear blade pressure side 94 and the rear blade suction side 96. In at least one embodiment, the main body thickness, $t_{mb}$, is greater than the front blade maximum thickness, $t_1$, and the rear blade maximum thickness, $t_2$.

The rear blade 26 is circumferentially spaced apart from the front blade 24. The rear blade 26 is circumferentially offset from the front blade 24 in a direction that extends from the front blade suction side 66 towards the front blade pressure side 64 such that the rear blade 26 is disposed proximate the front blade pressure side 64. In such an embodiment, the rear blade leading edge 90 is disposed proximate the front blade pressure side 64. In at least one embodiment, the rear blade 26 is circumferentially offset from the front blade 24 in a direction that extends from the front blade pressure side 64 towards the front blade suction side 66, such that the rear blade is disposed proximate the front blade suction side 66. In such an embodiment, the front blade trailing edge 62 is disposed proximate the rear blade suction side 96.

The front blade 24 and the rear blade 26 extending from the main body 22 increases solidity of the tandem tip blade 20 near the front blade tip 72 and the rear blade tip 102. The increase in solidity delays stall of the gas turbine engine. Additionally, if supersonic flow occurs near the front blade tip 72, the front blade 24 may diffuse or slow down the supersonic flow and the rear blade 26 turns the airflow and experiences the loading. In at least one embodiment, the front blade 24 is shaped such that the front blade 24 has a front blade thickness and no camber angle for transonic inlet flow. The front blade 24 may be substantially flat in such an embodiment. The rear blade 26 is shaped such that the rear blade 26 has a rear blade thickness and a camber angle for at least one of subsonic and low transonic passage flow. The rear blade 26 turns the airflow in such an embodiment.

In other embodiments, the front blade 24 is shaped such that the front blade 24 has a front blade thickness and camber angle for subsonic inlet flow. The rear blade 26 is shaped such that the rear blade 26 has a rear blade thickness with a camber angle. The front blade 24 turns the airflow in such an embodiment.

This tandem blade shape may improve stall margin of the tandem tip blade 20 and the stall margin of the overall gas turbine engine that incorporates the tandem tip blade 20 by changing the boundary layer structure on the tandem blade surface. The tandem blade shape may also reduce the losses of leakage due to the elimination of stationary parts between stages.

Figure 6:
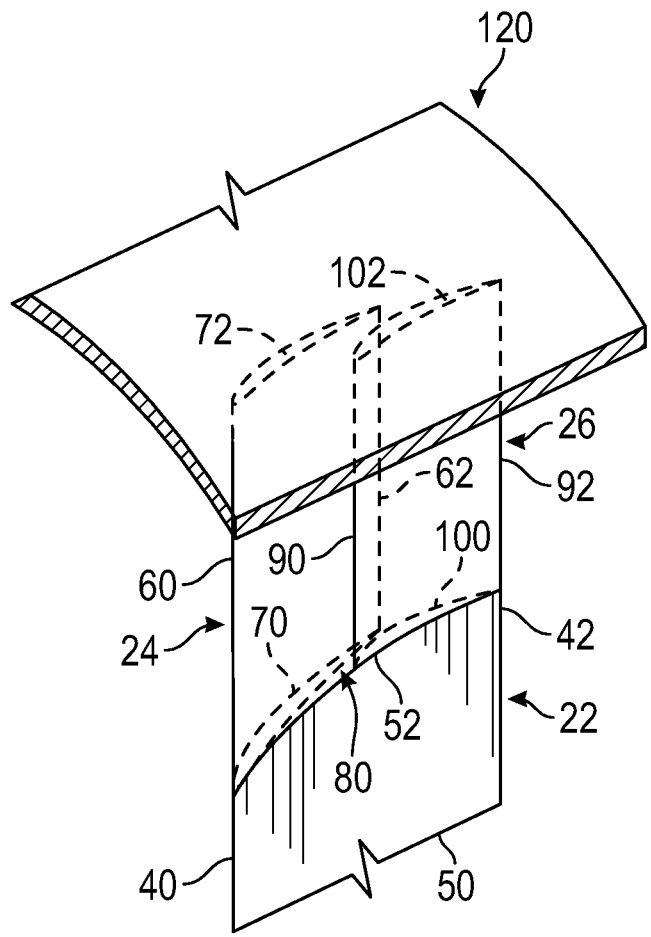
FIG. 6 is a perspective view of an embodiment of a tandem blade having a shroud.

Referring to FIG. 6, a shroud 120 may be provided. The shroud 120 may be disposed on at least one of the front blade 24 and the rear blade 26. The shroud 120 may be integrally formed with at least one of the front blade tip 72 and the rear blade tip 102. The shroud 120 may aid in improving a forced response of the tandem tip blade 20 during the vibration due to unsteady flow.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A tandem tip blade, comprising:
    a main body extending from a base along a span wise axis, the main body having a main body leading edge disposed opposite a main body trailing edge;
    a front blade extending from a main body end, the front blade having a front blade leading edge disposed opposite a front blade trailing edge; and
    a rear blade extending from the main body end, the rear blade spaced apart from the front blade, the rear blade having a rear blade leading edge disposed opposite a rear blade trailing edge, the rear blade leading edge abuts the front blade trailing edge.

2. The tandem tip blade of claim 1, wherein the front blade leading edge is a smooth extension of the main body leading edge.

3. The tandem tip blade of claim 1, wherein the rear blade trailing edge is a smooth extension of the main body trailing edge.

4. The tandem tip blade of claim 1, wherein the front blade and the rear blade extend from a transition region disposed at a mid-span region of the tandem tip blade.

5. The tandem tip blade of claim 1, further comprising a shroud that engages respective tips of the front blade and the rear blade.

6. A tandem blade, comprising:
    a front blade extending from a main body end, the front blade having a front blade pressure side disposed opposite a front blade suction side, each of the front blade pressure and the front blade suction side extending between a front blade leading edge and a front blade trailing edge and a front blade tip extending from the front blade pressure side to the front blade suction side; and
    a rear blade extending from the main body end, the rear blade having a rear blade pressure side disposed opposite a rear blade suction side, each of the rear blade pressure side and the rear blade suction side extending between a rear blade leading edge and a rear blade trailing edge, and a rear blade tip extending from the rear blade pressure side to the rear blade suction side, the rear blade leading edge abuts the front blade trailing edge.

7. The tandem blade of claim 6, wherein the front blade trailing edge is disposed at the rear blade suction side and the rear blade leading edge is disposed at the front blade pressure side.

8. The tandem blade of claim 6, wherein the front blade and the rear blade extend from a mid-span region disposed at the main body end.

9. The tandem blade of claim 6, wherein the front blade and the rear blade extend from a transition region disposed between a mid-span region, a front blade base, and a rear blade base.

10. The tandem blade of claim 6, wherein the main body has a main body pressure side disposed opposite a main body suction side extending between a main body leading edge and a main body trailing edge.

11. The tandem blade of claim 10, wherein the main body has a main body thickness extending between the main body pressure side and the main body suction side.

12. The tandem blade of claim 11, wherein the front blade has a front blade thickness extending between the front blade pressure side and the front blade pressure side and the rear blade has a rear blade thickness extending between the rear blade pressure side and the rear blade suction side.

13. The tandem blade of claim 12, wherein the main body thickness is greater than each of the front blade thickness and the rear blade thickness.

14. The tandem blade of claim 6, further comprising a shroud that engages the tips of the front blade and the rear blade.

15. A gas turbine engine, comprising:
    a fan section;
    a compressor section disposed adjacent to the fan section;
    a combustor section disposed adjacent to the compressor section;
    a turbine section disposed adjacent to the combustor section; and
    a tandem tip blade incorporated into a rotor provided with the compressor section, the tandem tip blade comprising:
        a main body having a main body leading edge disposed opposite a main body trailing edge;
        a front blade extending radially from a main body end towards a front blade tip and axially from the main body leading edge towards a mid-chord of the main body; and
        a rear blade spaced apart from the front blade towards a rear blade tip and extending radially from the main body end and axially from the main body trailing edge towards the mid-chord of the main body, a leading edge of the rear blade abuts a trailing edge of the front blade.

16. The gas turbine engine of claim 15, wherein the front blade is shaped for transonic inlet flow and the rear blade is shaped for at least one of subsonic and low transonic passage flow and turns the passage flow.

17. The gas turbine engine of claim 15, wherein the front blade is shaped for subsonic inlet flow and turns the subsonic inlet flow.

* * * * *